HENRY AIKEN.
Improvement in Friction Clutch.
No. 124,529.
Patented March 12, 1872.
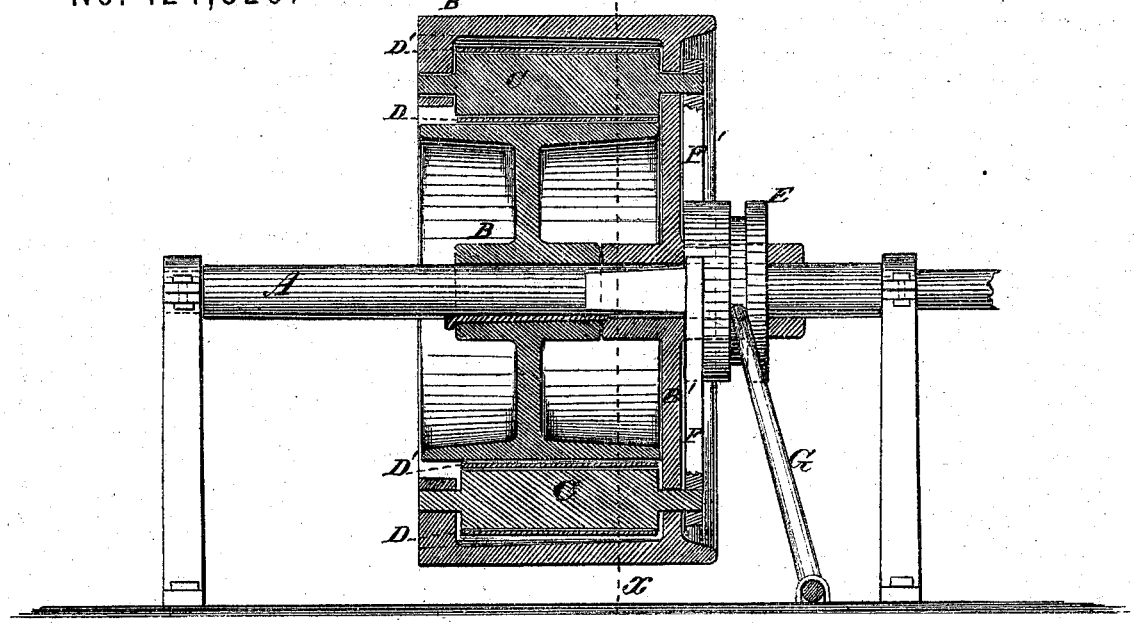
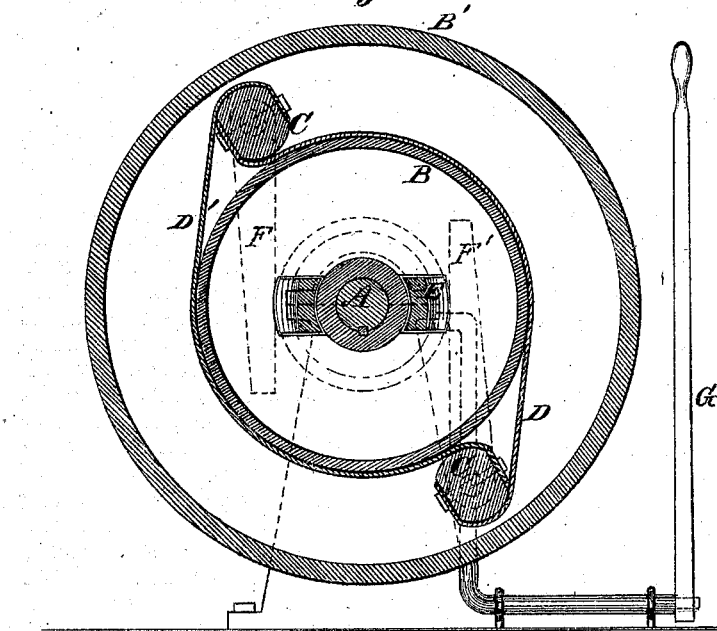
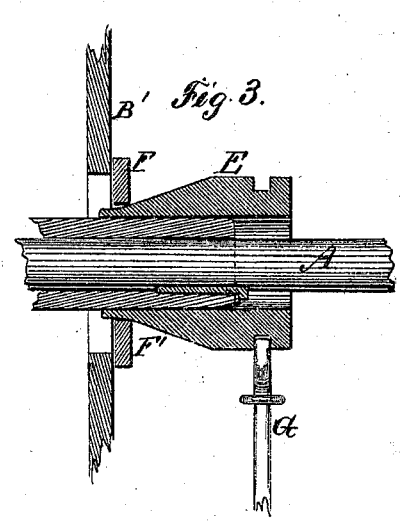
Witnesses.
A. Ruppert
C. F. Clausen
H. Aiken
Inventor.

124,529

UNITED STATES PATENT OFFICE.

HENRY AIKEN, OF PHILADELPHIA, PENNSYLVANIA.

IMPROVEMENT IN FRICTION-CLUTCHES.

Specification forming part of Letters Patent No. 124,529, dated March 12, 1872.

*To all whom it may concern:*

Be it known that I, HENRY AIKEN, of the city and county of Philadelphia and State of Pennsylvania, have invented certain Improvements in Clutches or Couplings; and I do hereby declare that the following is a full, clear, and exact description thereof, reference being had to the annexed drawing making part of this specification, in which—

Figure 1 is a longitudinal section of my improved clutch, showing a shaft to which the interior or central portion is secured, together with such central portion, the outer portion over which the belt passes, the rollers or shafts for tightening the bands which attach the two parts to each other, the levers for turning such shafts, and the lever which moves the sliding cone. Fig. 2 is a transverse section on line $x$ $x$ of Fig. 1, showing the rims of the outer and inner portions of the clutch, the bands which attach the parts to each other, the shafts or rollers around which such bands pass and to which they are secured, and in dotted lines the levers for turning such shafts. Fig. 3 is a transverse section of the conical slide which operates the levers.

Corresponding letters refer to corresponding parts in the several figures.

This invention relates to pulleys or clutches for driving machinery, it being designed for use in cases where it is necessary to have the machine or shaft which it drives, or which drives it, move only a portion of the time; and to this end it consists in a clutch constructed in two parts or sections, either one of which is capable of being rotated while the other is in a state of rest, but which may be so united or connected as to be compelled to travel together by means of bands of metal or other material passing around portions of the periphery of one of such sections. And it further consists in the combination and arrangement of the parts of which it is composed, as will be more fully described hereinafter.

In clutching devices as heretofore constructed great difficulty has been experienced from the fact that the application of the necessary force to drive the machinery to which they have been attached has rendered it very difficult at times to unclutch or disconnect the parts, when it became necessary to do so to prevent injury being done to such machinery; and, further, from the fact that no provision has been made for the slipping of the parts when an unusual strain has been brought to bear upon the clutch in consequence of unusual resistance in the machinery which they were driving. The object sought to be obtained by this invention is the removal of the difficulties which exist at present, by providing a clutch which may be readily disconnected when in use and when driving machinery or being driven by it, and which shall be so constructed that the part which receives the force from the driving-shaft shall, when any unusual amount of resistance is offered, slip or turn without moving the part which transfers the power or motion to the machine, and thus prevent the breakage or injury thereof.

To enable those skilled in the art to make and use my invention, I will proceed to describe its construction and operation.

A refers to a shaft, which may be a portion of a line of shafting extending through a building or any portion thereof; or it may be the shaft of a rolling-mill, or quartz-crushing machine, or printing-press for cloth or paper, or any other machine which it is desirable to drive with such a clutch. Upon the shaft A there is to be secured a pulley, B, the construction of which may be like any belt-pulley, it having a hub through which the shaft passes, a diaphragm or arms to connect such hub and the rim. The diameter of such pulley will be controlled by the machine which it is intended to drive. Surrounding this pulley B there is placed a section or portion, $B^1$, which is represented in the drawing as a pulley of larger diameter, but which may be a gear-wheel of any desired form, in one end of which there is a head, which extends inward to the shaft, and has upon its central portion a hub for the purpose of giving it a bearing upon the shaft A. Upon the opposite side of the rim of section $B^1$ there are lugs, which extend nearly to the periphery of the rim of the central section, the office of these lugs being to receive and hold the outer ends of the rollers or shafts C C, which extend therefrom to and are journaled in the head in the opposite end of the part $B^2$. There are two of the shafts or rollers above referred to, they being placed opposite each other and between the inner and outer rims of the parts B $B^1$. To each of these shafts or rollers bands of metal, D D', or other suitable material are secured, the ends of which are fastened to opposite sides of the rollers by buttons, hooks, or pins, so that they may be easily attached thereto or detached therefrom, and so that as such shafts are turned said bands will be caused to press upon the periphery of the interior section of the clutch on both sides thereof, and thus prevent it from turning under all ordinary circumstances without carrying with it the outer section. It is apparent that the driving power may be applied to the outer section of the clutch and from it communicated to the shaft through the inner portion without changing the construction or arrangement of the parts in any degree. In order that the shafts or rollers C C may be partially rotated so as to tighten and loosen the bands D D', levers F F are attached to the journals of such rollers, they being made to protrude through the head of section $B^1$ of the clutch for that purpose. To actuate these levers a conical slide, E, is fitted to an outwardly-projecting hub upon the section $B^1$ of the pulley, or upon the shaft on which it is placed. The conical portion of this slide may be an entire circle, or it may consist of sections, as shown in Fig. 1, its office being to press outward the ends of levers F F, and thus turn the rollers or shafts, as above described. By making that portion of the slide E which passes under the ends of the levers more or less conical or tapering, and by adding to the length of the levers, it is apparent that any amount of force may be applied to the bands that will be necessary to cause them to drive the heaviest kinds of machinery. In order that the slide E may properly perform the function referred to, it is provided with a groove in its outer end, into which the bifurcated end of a lever passes, said lever shown in the drawing, and designated by the letter G.

Whenever it is desirable to have all of the parts of this clutch move together, the handle of lever or shipper G is moved into such a position as to carry the conical slide inward so that its larger diameter may cause the ends of the levers F F to be carried outward, and thus the rollers turned so far as to cause the bands D D' to be brought into contact with the rim of section B of the clutch, which contact will cause a sufficient amount of friction to drive the other part and with it any machine to which it may be attached. When it is desirable to set the conical slide in such a position that the friction caused shall not exceed a certain limit, a sector with notches in it, or notched bar, may be placed beside the handle of lever G, into which notches such handle may fall or pass, and thus be held in any desired position, which position will be such that in the event of any unusual or extraordinary resistance being offered to the movements of the machine, the inner section of the clutch shall slip or turn within such bands, and thus permit the machine to be stopped before any serious damage has been done thereto.

What I claim as my invention, and desire to secure by Letters Patent, is—

1. A friction-clutch combining the tight and loose parts B $B^1$, and flexible bands, by the compression of which the parts may be connected, substantially in the manner set forth.

2. In combination with the pulley B and flexible bands D D', the rollers C, to which the bands are attached, so as to operate substantially in the manner set forth.

3. In combination with said parts B $B^1$, bands, and rollers, the levers for revolving the rollers in opposite directions.

4. In combination with said levers, operating as aforesaid, the cone or inclined plane E, arranged to act upon the levers, substantially as set forth.

In testimony whereof I have signed my name to this specification in the presence of two subscribing witnesses.

HENRY AIKEN.

Witnesses:
R. MASON,
B. EDW. J. EILS.